United States Patent [19]

Hwang et al.

[11] Patent Number: 4,751,044

[45] Date of Patent: Jun. 14, 1988

[54] COMPOSITE NUCLEAR FUEL CLADDING TUBING AND OTHER CORE INTERNAL STRUCTURES WITH IMPROVED CORROSION RESISTANCE

[75] Inventors: Sun-Keun Hwang, Seoul, Rep. of Korea; George P. Sabol, Murrysville; Robert F. Barry, Monroeville, both of Pa.

[73] Assignee: Westinghouse Electric Corp., Pittsburgh, Pa.

[21] Appl. No.: 766,323

[22] Filed: Aug. 15, 1985

[51] Int. Cl.[4] .............................................. G21C 3/06
[52] U.S. Cl. ................................................. 376/416
[58] Field of Search .............. 376/416, 417, 414, 419; 420/422

[56] References Cited

U.S. PATENT DOCUMENTS

| | | | |
|---|---|---|---|
| 2,956,000 | 10/1960 | Kendall et al. | 376/416 |
| 3,212,988 | 10/1965 | Ringot | 376/416 |
| 3,301,763 | 1/1967 | Beatty et al. | 376/416 |
| 3,304,235 | 2/1967 | Granata et al. | 376/416 |
| 3,359,176 | 12/1967 | Antill et al. | 376/416 |
| 3,409,504 | 11/1968 | Bailly et al. | 376/416 |
| 3,802,939 | 4/1974 | Ohtani et al. | 148/133 |
| 3,850,584 | 11/1974 | Bohm et al. | 376/416 |
| 3,911,194 | 10/1975 | Oejachy et al. | 376/416 |
| 3,993,453 | 11/1976 | Ross et al. | 29/191.2 |
| 4,268,586 | 5/1981 | Hanneman et al. | 428/661 |
| 4,337,300 | 6/1982 | Itaba et al. | 428/627 |
| 4,343,659 | 8/1982 | Murakami et al. | 148/6.3 |
| 4,406,012 | 9/1983 | Gordon et al. | 376/414 |
| 4,411,960 | 10/1983 | Mizuhara | 428/610 |
| 4,445,942 | 5/1984 | Cheng et al. | 376/416 |

FOREIGN PATENT DOCUMENTS

| | | |
|---|---|---|
| 2825371 | 12/1978 | Fed. Rep. of Germany ...... 376/417 |
| 2825403 | 12/1978 | Fed. Rep. of Germany ...... 376/417 |
| 0126891 | 10/1980 | Japan ................................ 376/416 |
| 1600169 | 10/1981 | United Kingdom . |

OTHER PUBLICATIONS

Reactor Handbook, Materials: General Properties, "Zirconium and Its Alloys", United States Atomic Energy Commission, McGraw-Hill Book Company, Inc., 1955, p. 493.

Primary Examiner—Deborah L. Kyle
Assistant Examiner—Daniel Wasil
Attorney, Agent, or Firm—John J. Prizzi; Donald M. Satina

[57] ABSTRACT

An elongated nuclear fuel cladding tube is provided with at least two annular concentric layers which are bonded to each other. The inner layer is composed of a zirconium base alloy. The outer layer is composed of a titanium base material exhibiting excellent corrosion resistance in elevated temperature and pressure aqueous environments.

14 Claims, 4 Drawing Sheets

COMPOSITE NUCLEAR FUEL CLADDING TUBING AND OTHER CORE INTERNAL STRUCTURES WITH IMPROVED CORROSION RESISTANCE

BACKGROUND OF THE INVENTION

The present invention relates to water reactor internal structures having a titanium material coating over a zirconium base alloy. It is especially concerned with the cladding of water reactor fuel rods.

Nuclear fuel cladding for light water reactors requires resistance to corrosion in high temperature, high pressure aqueous liquid and/or steam conditions. In addition, nuclear fuel cladding also requires adequate structural mechanical properties and a low thermal neutron absorption cross section.

The initial material chosen for light water reactor fuel cladding was zirconium. However, it was soon found that a material possessing improved strength and corrosion resistance compared to zirconium would be desirable. Development work to improve the corrosion resistance and/or strength of zirconium fuel cladding may be divided into two general areas: (1) those efforts seeking to improve corrosion resistance and/or strength by making alloying element additions; and (2) those efforts seeking to improve corrosion resistance and/or strength by coating the zirconium cladding with a non-zirconium base material. The efforts in the area of zirconium base alloys eventually were fruitful and have resulted in a number of commercial zirconium base alloys for use as nuclear fuel cladding. These commercial alloys include Zircaloy-2 and Zircaloy-4.

The development efforts in the area of coated zirconium fuel cladding were, to our knowledge, unsuccessful. These efforts, however, included looking at coatings of beryllium, Inconel, Monel (Inconel and Monel are, respectively, trademarks of INCO Alloys International, Inc. for their nickel-chromium and nickel-copper alloys), nickel, iron, molybdenum, platinum, silver, 18-8 stainless steel, tantalum and titanium. Of all the foregoing materials only titanium could produce a ductile metallurgical bond with zirconium that did not contain brittle intermetallic compounds. However, the thermal neutron absorption cross section of titanium is significantly higher than that of zirconium (approximately 5.6 (barns) for titanium and 0.18 for zirconium). In addition, the investigators reported that the aqueous corrosion properties of titanium were not much better than those of zirconium.

Zircaloy-2 and 4 because of their low thermal neutron cross section (about 0.22 barns), high strength and relatively good aqueous corrosion resistance, have remained the alloys of choice for commercial light water reactor fuel cladding and structural members. The corrosion resistance of these Zircaloy components has been further improved by heat treatments, such as beta quenching.

The present inventors have now found, contrary to the aforementioned results of the prior investigators, that titanium and its alloys possess significant advantages over Zircaloy in the area of aqueous corrosion resistance. Therefore, in accordance with the present invention, an elongated nuclear fuel cladding tube, or other nuclear component, is provided which has an inner layer of a zirconium base alloy, over which is a second layer of titanium material selected from the group consisting of titanium, titanium alloys, titanium compounds, and their combinations with each other.

The composition of the titanium material has been selected such that the aqueous long term corrosion rate of the titanium material in 680° F., 2700 psi water is about 1/10 or less of the aqueous post transition corrosion rate of Zircaloy-4 under the same conditions. More preferably, the corrosion rate of the selected titanium material is about 1/100, or less, that of Zircaloy-4 under the foregoing conditions.

Preferably the layer of titanium material has a wall thickness of less than about 0.004 inches, more preferably less than about 0.001 inches, and most preferably less than about 0.0005 inches. Preferably the layer of titanium material is at least about 0.000014 inches thick.

The foregoing and other aspects of the present invention will become more apparent upon review of the drawings, which are briefly described below, in conjunction with the following detailed description of the invention.

DETAILED DESCRIPTION OF THE INVENTION

Figure 1:
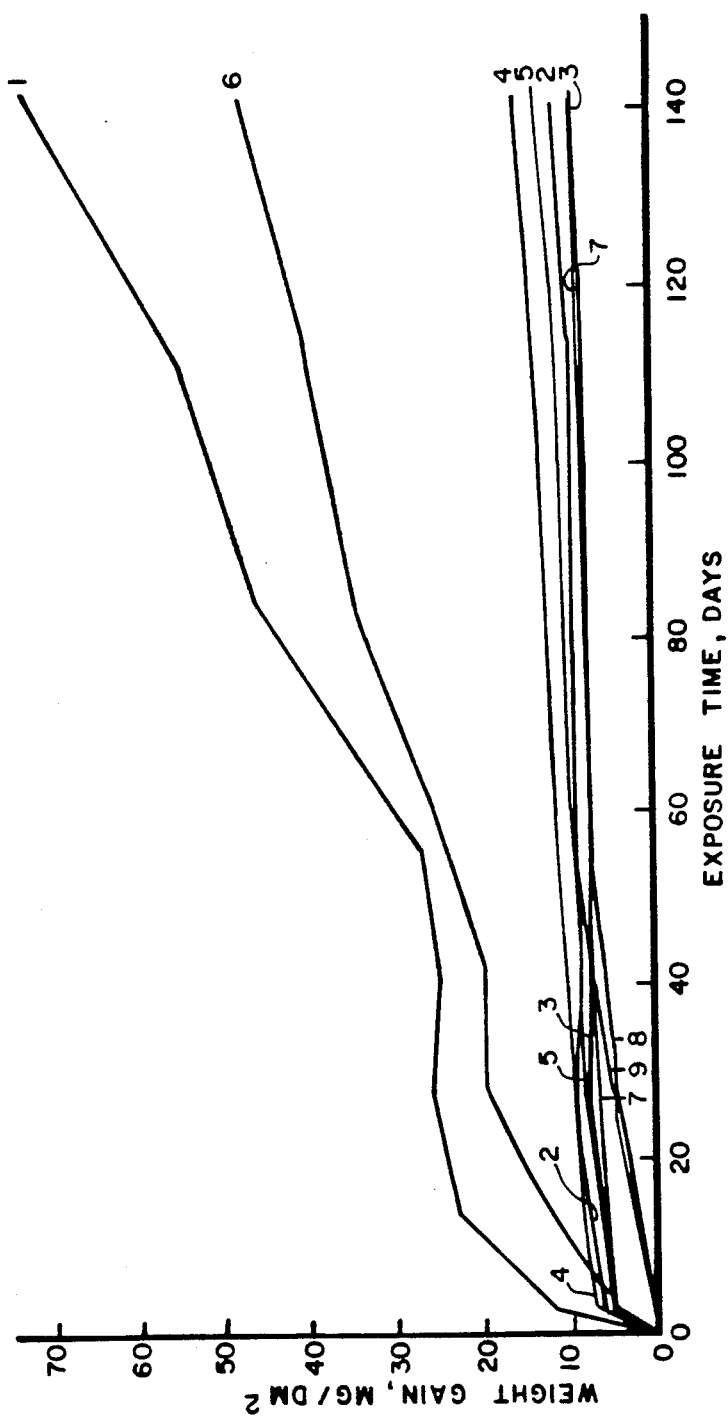
FIG. 1 compares the long term corrosion kinetics of Zircaloy-4 to that of titanium and titanium alloy tubing in various conditions in a 680° F., 2700 psi water environment.

We have surprisingly found that essentially pure titanium and an alpha (hexagonal-close-packed crystal structure) and beta (body-centered-cubic crystal structure) titanium alloy, containing nominally 3 w/o Al and 2.5 w/o V, have significantly improved aqueous corrosion resistance compared to Zircaloy-2 and 4. These findings now make it practical to construct composite nuclear fuel cladding and other internal structural members for water reactor applications, in which there is an outer layer of titanium material in contact with the aqueous coolant. As already noted, the general belief in the art, that titanium's aqueous corrosion resistance was comparable to that of zirconium coupled with titanium's high thermal neutron cross section compared to zirconium, led those of ordinary skill in the art to disregard titanium and titanium alloys as practical materials for use in thermal neutron reactors such as BWRs (boiling water reactors) and PWRs (pressurized water reactors).

Our discovery of the enhanced corrosion resistance of titanium and its alloys makes it practical to construct composite fuel cladding having a thin outer layer of a titanium material. Preferably the titanium layer has a long term corrosion rate in 680° F., 2700 psi water which is about 1/10 or less of that of Zircaloy-4 under the same conditions, and more preferably less than or equal to about 1/100 that of Zircaloy-4.

With these significantly enhanced corrosion properties only a thin layer of titanium needs to be bonded to the exterior surface of a zirconium alloy fuel cladding tube to provide the cladding with enhanced corrosion resistance. Thus, the adverse impact of titanium's high thermal neutron cross section is minimized. It is currently contemplated that the titanium material in the outer layer should have a thickness of less than about 0.004 inches, more preferably less than about 0.001 inches, and most preferably less than about 0.0005 inches. The thinnest coatings are preferred to minimize the effects of titanium high thermal neutron cross section. Depending upon the thickness selected, the composite cladding may be fabricated by conventional roll bonding (i.e. coextrusion followed by cold pilgering and annealing steps), or PVD (physical vapor deposition), or CVD (chemical vapor deposition) techniques.

The following examples are provided to further clarify the present invention and are intended to be purely exemplary of the invention. The corrosion resistance of commercially pure titanium and a titanium alloy (Ti-3Al-2.5V) was evaluated in water environments. Materials tested were tubes, their dimensions being 0.502 inch O.D./0.036 inch wall, 0.500 inch O.D./0.036 inch wall, and 0.625 inch O.D./0.032 inch wall for grade 2 pure titanium seamless tubing, pure titanium welded tubing and Ti-3Al-2.5V alloy seamless tubing, respectively. Vendor certificates of commercially pure titanium materials are summarized in Table I. Ti-3Al-2.5V generally has the following composition limits (in weight percent): 2.5–3.5 Al; 2.0–3.0 V; 0.12 max. O; 0.002 max. N; 0.10 max. C; 0.25 max. Fe; 0.013 max. H; remainder Ti, except for minor impurities (see ASTM B338-83 grade and SAE specifications AMS 4943C (1985 Rev.) and AMS 4944C (1985 Rev.)).

TABLE I

Vendor Certificates of Titanium Materials

1. Seamless Tubing
   Specification: ASTM B 338* grade 2
   Chemical Composition (wt. %)**:
   C: 0.009 N: 0.006 O: 0.114 Fe: 0.039 H: 0.0022 Ti: Balance
   Mechanical Properties:
   Yield: 45.5 ksi UTS: 72.5 ksi Elong.: 34.0%
   Vendor: Tico Titanium
2. Welded Ti-Tubing
   Specification: ASTM B 338* grade 2
   Chemical Composition (wt. %)**:
   C: 0.012 N: 0.011 O: 0.10 Fe: 0.18 H: 0.007 Ti: Balance
   Mechanical Properties:
   Yield: 62 ksi UTS: 82.5 ksi Elong.: 31%
   Vendor: Titanium Metals Corporation of America

*ASTM B 338 is hereby incorporated by reference.
**This tubing also meets the chemistry requirements of ASTM B338 grade 1.

The material conditions for the corrosion coupons were as follows (numbers listed below refer to the reference numerals in FIGS. 1, 2 and 3):
(1) Zircaloy control: either standard Zircaloy-4 or laser beta-treated Zircaloy-2, all pickled
(2) Pure titanium, seamless, as-received
(3) Pure titanium, seamless, pickled
(4) Ti-3Al-2.5V, as-received
(5) Ti-3Al-2.5V, pickled
(6) Pure titanium, welded, as-received
(7) Pure titanium, welded, pickled
(8) Ti-3Al-2.5V, laser-treated, as-received
(9) Ti-3Al-2.5V, laser-treated, pickled The as-received samples were cleaned in acetone and ethyl alcohol (200 purity), and the pickled titanium and titanium alloy specimens were etched by submersing coupons for 15 seconds in a solution of 90 parts $H_2O$, 30 parts HF, 20 parts $H_2O_2$ and 60 parts $HNO_3$ (all parts on a volume basis). The laser treatments of the titanium and titanium alloy materials were conducted above 1700° F., producing a complete through wall transformation to the beta phase at the heat treatment temperature and subsequent transformation to alpha and beta with the typical basket weave morphology.

The corrosion data were averaged from the weight gains of two to four coupons for each condition. The average pH and the average conductivity of the deionized water in the autoclaves were 6.5 and 0.34 micromho, respectively, in the beginning of the experiment. The post test average pH was 6.7.

Figure 2:
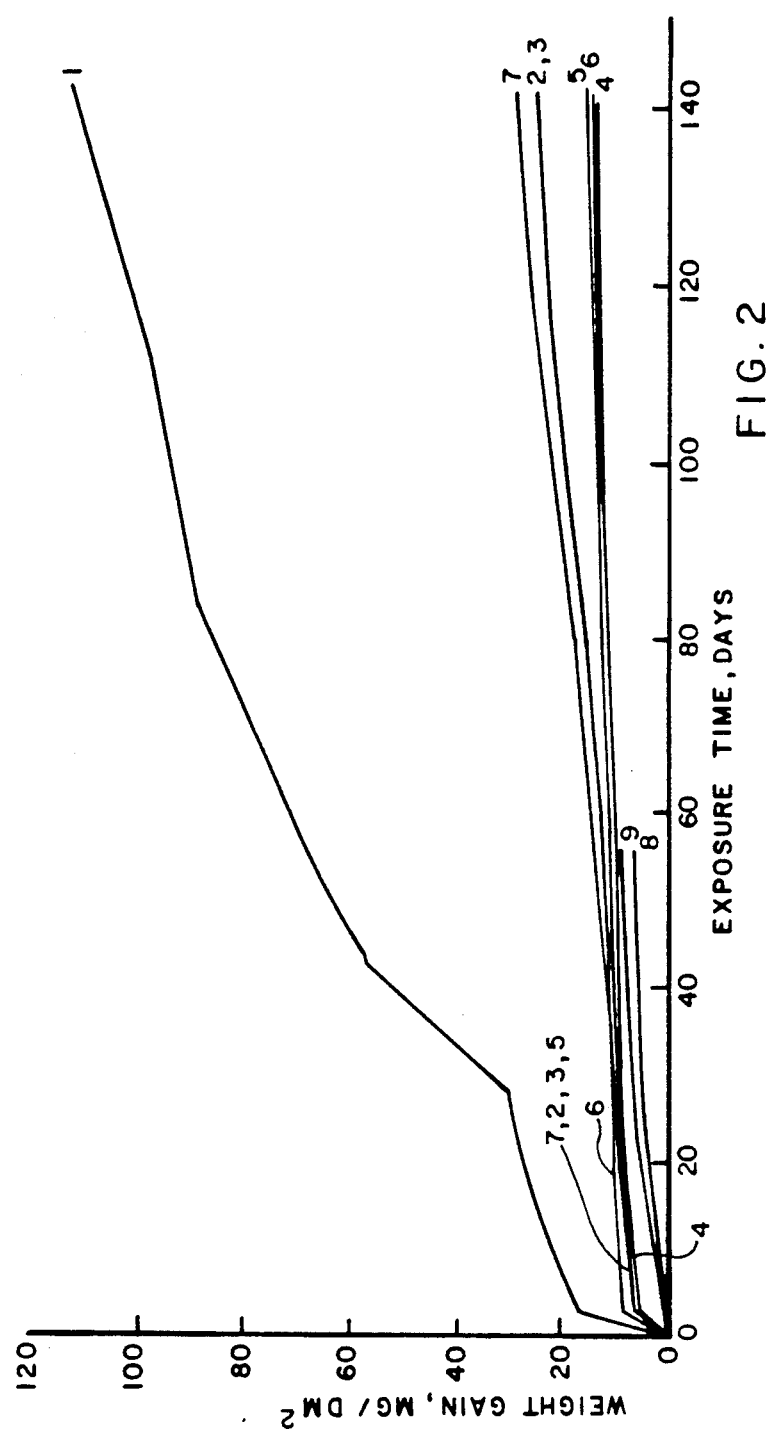
FIG. 2 compares the long term corrosion kinetics of Zircaloy-4 to that of titanium and titanium alloy tubing in various conditions in 750° F., 1500 psi steam environment.
Figure 3:
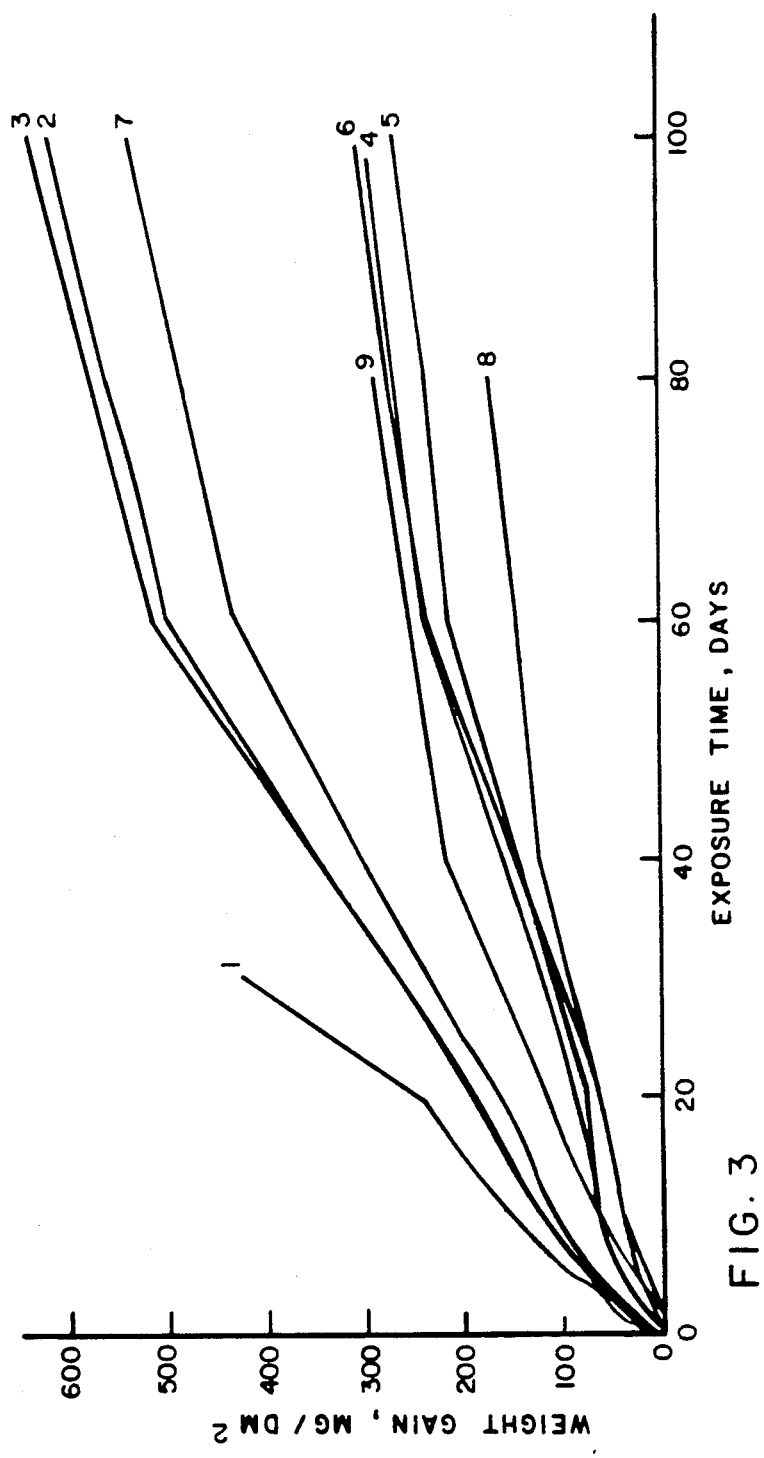
FIG. 3 compares the long term corrosion kinetics of beta quenched Zircaloy-2 to that of titanium and titanium alloy tubing in various conditions in 932° F., 1500 psi steam environment.

The corrosion tests were performed at 680° F. steam (2700 psi), 750° F. steam (1500 psi) and 932° F. steam (1500 psi) and the plots of the average weight gains in the three environments are respectively shown in FIGS. 1, 2 and 3. All the pure titanium and titanium alloy specimens showed smaller weight gains than the control Zircaloy-4 tubes in the 680° F. and 750° F. environments. Especially in 932° F. steam, the titanium samples survived 100 days' exposure and still maintained an adherent oxide, while the control samples made from laser-treated Zircaloy-2 started to spall after 30 days' exposure. The surface of titanium specimens showed thin, adherent films after all the exposures.

Metal loss due to water corrosion was estimated from the weight gain data. The equation for the weight gain can be written as $$w = at^b$$

where 'w' is weight in $mg/dm^2$, 't' is time in days, and 'a' and 'b' are constants. The constants for the control Zircaloy-4 tubing (post-transition) and seamless pure titanium tubing in 680° F. water were as follows:

|  | a | b |
|---|---|---|
| Zircaloy-4 | 0.46 | 1.02 |
| Pure Ti | 4.97 | 0.10 |

From the rate equation, the weight gains for 6 years, the corresponding metal loss and the buildup of oxide film were estimated to be as shown in Table II.

TABLE II

|  | Wt. Gain ($mg/dm^2$) | Wall Thinning (mils) | Oxide Thickness (mils) |
|---|---|---|---|
| Zircaloy-4 | 1175 | 2.0 | 3.1 |
| Pure Ti | 11 | 0.014 | 0.025 |

Therefore, covering the O.D. surface of tubing with approximately 0.4 μm of titanium will be sufficient for withstanding 6 years of service, the resulting thickness of the oxide being less than 1/100 of that in Zircaloy-4.

Figure 4:
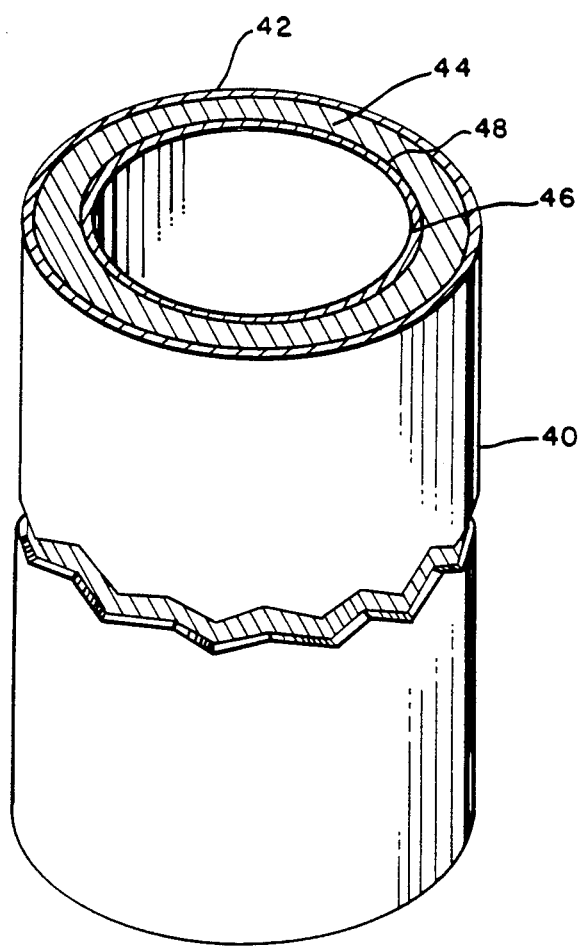
FIG. 4 shows a perspective view of an embodiment of the present invention.

A schematic design of a composite fuel cladding tube 40 in accordance with the present invention is shown in FIG. 4. An outer layer 42 of a titanium material selected from titanium, titanium alloys, titanium compounds and their mixtures with each other, is provided. Preferably this outer layer is as thin as possible, with the minimum thickness being preferably determined by the corrosion rate, or metal loss rate in pile, multiplied by the time of exposure required. For example, for the 6 year exposure in 680° F., 2700 psi water previously referred to herein, the minimum thickness of titanium is estimated to be about 0.4 μm (0.014 mils). However, the minimum thickness of the outer layer 42 may be further limited by the manufacturing and/or inspection techniques utilized. For example, for commercial coextrusion and copilgering, it is preferred that the wall thickness of the outer layer be about 0.001 inches. Other potential methods allowing significantly thinner coatings include CVD, PVD and electroplating techniques, which may be performed on the final size fuel cladding tube or the fuel rod itself after it has been loaded with fuel and the end caps welded on. Where a dilute titanium alloy (such as Ti-3Al-2.5V) is utilized for the outer layer 42, the microstructure may be refined by heat treatment into the beta or alpha+beta phase. Where essentially pure titanium is used the microstructure may be refined by heat treatment into the beta phase.

The outer layer 42 is bounded to an inner layer 44 which is composed of a dilute zirconium base alloy such as the commercial alloys Zircaloy-2 or 4 (containing 900 to 1600 ppm oxygen) or a zirconium niobium alloy, as described in ASTM B 353-77, which is hereby incorporated by reference (see UNS Nos. R60802, R60804 and R60901, respectively). Other zirconium-niobium alloys such as those described in copending U.S. patent application Ser. Nos. 693,545 and 693,547 (both filed on Jan. 22, 1985 and assigned to the Westinghouse Electric Corporation) may also form layer 44. It is preferred that the wall thickness of this layer 44 be as small as is possible commensurate with meeting the strength related property requirements of nuclear fuel rod cladding. One option under consideration in this regard is to utilize a dilute high strength zirconium base alloy such as a Zr-Al alloy as described in E. M. Schulson, "The Tensile and Corrosion Behaviour of Ordered $Zr_3Al$-Based Alloys", Journal of Nuclear Materials Vol. 50 (1974) pp. 127-138. E. M. Schulson describes a zirconium base alloy containing about 7 to about 9 w/o aluminum, having good aqueous corrosion resistance, good ductility, and significantly improved strength compared to Zircaloy-2. The E. M. Schulson et al. article is hereby incorporated by reference. High strength alloys offer the potential of reducing the wall thickness of layer 44 to help compensate for the parasitic neutron penalty of the titanium in layer 42.

Optionally, there may be a PCI (pellet cladding interaction) resistant liner 46 bonded to the inside diameter surface 48 of inner layer 44. The liner 46 may be zirconium as described in U.S. Pat. Nos. 4,200,492 and 4,372,817, or a soft zirconium base alloy.

While the invention has been illustrated by its application to nuclear fuel cladding and fuel rods, it is clear that it may also be applied to other water reactor zirconium base alloy components such as channels, spacers, grids, and thimble tubes, as needed to improve the corrosion resistance of these components. In these cases where aqueous corrosion will occur at two or more surfaces, the titanium material is preferably bonded to a zirconium base alloy on at least both its major surfaces, creating a sandwich type structure in which the zirconium alloy layer is located between two layers of titanium material.

While we have demonstrated the superior corrosion properties of essentially pure titanium and an alpha and beta titanium alloy using grade 2 and 9 of ASTMB338, we contemplate that there are other titanium compositions which will also have similar corrosion properties and specifically contemplate the use of titanium and titanium alloy compositions meeting the chemistry requirements of grades 1, 3, 7, 10, 11 and 12 as shown in Table 1 of ASTMB338-83. It is further contemplated, in order to protect the thin titanium or titanium alloy coating in accordance with the present invention from damage during handling of the components so coated, that a thin, hard titanium compound coating may be formed over the titanium material coating. It is specifically contemplated that this titanium compound may be titanium oxide formed by oxidizing the titanium material in an autoclave or through anodization.

The preceding examples have clearly demonstrated the benefits obtainable through the practice of the present invention. Other embodiments of the invention will become more apparent to those skilled in the art from a consideration of the specification or actual practice of the invention disclosed herein. It is intended that the specification and examples be considered as exemplary only, with the true scope and spirit of the invention being indicated by the following claims. All of the documents previously cited herein are hereby incorporated by reference.

We claim:

1. An elongated nuclear fuel cladding tube consisting of:
    an inner continuous annular layer composed of a zirconium alloy; and
    an outer annular layer composed of a titanium material selected from the group consisting of titanium, titanium alloys, titanium compounds and their combinations with each other;
    said outer annular layer concentric with said inner annular layer and bonded to the outer circumference of said inner annular layer;
    and said outer annular layer having a wall thickness of between about 0.000014 to about 0.004 inches.

2. The cladding tube according to claim 1 wherein the wall thickness of said outer annular layer is between about 0.000014 to about 0.001 inches.

3. The cladding tube according to claim 1 wherein the wall thickness of said outer annular layer is between about 0.000014 to about 0.0005 inches.

4. The cladding tube according to claim 1 wherein the long term corrosion rate of said titanium material is less than about 1/10 the post transition corrosion rate of Zircaloy-4 in 680° F., 2700 psi water.

5. The cladding tube according to claim 1 wherein the long term corrosion rate of said titanium material is less than about 1/100 the post transition corrosion rate of Zircaloy-4 in 680° F., 2700 psi water.

6. The cladding tube according to claim 1 wherein said titanium material is essentially pure titanium metal.

7. The cladding tube according to claim 1 wherein said titanium material is an alpha+beta titanium alloy.

8. The cladding tube according to claim 7 wherein said alpha+beta titanium alloy contains nominally about 3 w/o Al and about 2.5 w/o V with the balance being essentially titanium.

9. A nuclear water reactor component having at least one major surface for contacting the reactor coolant, said component comprising:
    a continuous zirconium base alloy layer;
    a titanium material layer selected from the group consisting of titanium, titanium base alloys, titanium compounds and their combinations with each other;
    said titanium material layer bonded to said zirconium base alloy layer;
    and said titanium material layer forming said major surface for contacting said reactor coolant;

said titanium material layer having aqueous corrosion resistance properties superior to the aqueous corrosion resistance properties of said zirconium base alloy material for improving the aqueous corrosion resistance of said nuclear water reactor component.

10. An elongated composite nuclear fuel cladding tube comprising:
an intermediate annular layer composed of a zirconium alloy;
an outer annular layer composed of titanium material selected from the group consisting of titanium, titanium alloys, titanium compounds and their combination with each other, said outer annular layer being bonded to the outer circumference of said intermediate annular layer; and
an inner annular layer composed of a zirconium material selected from the group consisting of zirconium and zirconium base alloys, said inner annular layer being bonded to the inside circumference of said intermediate annular layer for resisting pellet cladding interaction;
said outer annular layer having a wall thickness of between about 0.000014 to about 0.0004 inches.

11. The cladding tube according to claim 10 wherein the wall thickness of said outer annular layer is between about 0.000014 to about 0.0001 inches.

12. The cladding tube according to claim 11 wherein said outer layer of titanium material comprises a combination of two titanium materials arranged as an inner portion and an outer portion, the inner portion comprising a titanium material selected from the group consisting of titanium, titanium alloys, and titanium compounds and the outer portion comprising the titanium compound titanium oxide.

13. The cladding tube according to claim 12 wherein said titanium material comprising said inner portion of said outer layer is essentially pure titanium.

14. The cladding tube according to claim 12 wherein said titanium material comprising said inner portion of said outer layer is a dilute alpha beta titanium alloy.

* * * * *